(12) United States Patent
Natanzon et al.

(10) Patent No.: US 9,946,649 B1
(45) Date of Patent: Apr. 17, 2018

(54) DATA COHERENCY SYSTEM AND METHOD

(71) Applicant: EMC Corporation, Hopkinton, MA (US)

(72) Inventors: Assaf Natanzon, Ramat Gan (IL); Steven R. Bromling, Edmonton (CA); Joshua C. Baergen, Edmonton (CA); Michael Trachtman, Arlington, MA (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 79 days.

(21) Appl. No.: 14/755,873

(22) Filed: Jun. 30, 2015

(51) Int. Cl.
*G06F 12/00* (2006.01)
*G06F 12/0817* (2016.01)

(52) U.S. Cl.
CPC .... *G06F 12/0828* (2013.01); *G06F 2212/621* (2013.01)

(58) Field of Classification Search
CPC ............ G06F 12/0817; G06F 12/0813; G06F 12/0815
See application file for complete search history.

(56) References Cited

U.S. PATENT DOCUMENTS

| | | | | |
|---|---|---|---|---|
| 5,678,026 A | * | 10/1997 | Vartti | G06F 13/18 710/200 |
| 6,473,849 B1 | * | 10/2002 | Keller | G06F 13/1657 709/210 |
| 6,490,661 B1 | * | 12/2002 | Keller | G06F 12/0813 711/130 |
| 2004/0117563 A1 | * | 6/2004 | Wu | G06F 9/52 711/150 |

\* cited by examiner

*Primary Examiner* — David X Yi
*Assistant Examiner* — Arvind Talukdar
(74) *Attorney, Agent, or Firm* — Brian J. Colandreo; Mark H. Whittenberger; Holland & Knight LLP

(57) ABSTRACT

A method, computer program product, and computing system for defining an IO splitter module within each of a plurality of nodes included within a hyper-converged storage environment. A coherency module is defined on at least one of the plurality of nodes. A data request is received.

17 Claims, 5 Drawing Sheets

DATA COHERENCY SYSTEM AND METHOD

TECHNICAL FIELD

This disclosure relates to data coherency systems and, more particularly, to data coherency systems for use in distributed storage systems.

BACKGROUND

Storing and safeguarding electronic content is of paramount importance in modern business. Accordingly, various data storage systems may be employed to protect such electronic content. Unfortunately, if the data storage system is distributed across multiple physical devices and the data is stored in a high availability fashion (e.g., via multiple redundant copies), procedures must be put in place to ensure the coherency of the multiple redundant copies.

SUMMARY OF DISCLOSURE

In one implementation, a computer-implemented method, executed on a computing device, includes defining an IO splitter module within each of a plurality of nodes included within a hyper-converged storage environment. A coherency module is defined on at least one of the plurality of nodes. A data request is received.

One or more of the following features may be included. The data request may be a data read request for a data extent. The data read request may be processed on a local IO splitter module of a local node that contains the data extent to be read. A local storage location within the local node that contains the data extent to be read may be locked via the coherency module. The data extent may be read from the local storage location. The local storage location within the local node that contains the data extent that was read may be unlocked via the coherency module.

Locking, via the coherency module, a local storage location within the local node that contains the data extent to be read may include: requesting a lock concerning the local storage location from the coherency module, and receiving a lock confirmation concerning the local storage location from the coherency module. Unlocking, via the coherency module, the local storage location within the local node that contains the data extent that was read may include: requesting an unlock concerning the local storage location from the coherency module, and receiving an unlock confirmation concerning the local storage location from the coherency module.

The data request may be a data write request for a data extent. The data write request may be processed on a local IO splitter module of a local node onto which the data extent is to be written. A remote storage location within a remote node into which a remote copy of the data extent is to be written and a local storage location within the local node into which a local copy of the data extent is to be written may be locked via the coherency module. The remote copy of the data extent may be written into the remote storage location and the remote storage location may be unlocked via the coherency module. The local copy of the data extent may be written into the local storage location and the local storage location may be unlocked via the coherency module.

Locking, via the coherency module, a remote storage location within a remote node into which a remote copy of the data extent is to be written and a local storage location within the local node into which a local copy of the data extent is to be written may include: requesting a lock concerning the remote storage location from the coherency module, receiving a lock confirmation concerning the remote storage location from the coherency module, requesting a lock concerning the local storage location from the coherency module, and receiving a lock confirmation concerning the local storage location from the coherency module.

Writing the remote copy of the data extent into the remote storage location and unlocking, via the coherency module, the remote storage location may include: requesting an unlock concerning the remote storage location from the coherency module, and receiving an unlock confirmation concerning the remote storage location from the coherency module. Writing the local copy of the data extent into the local storage location and unlocking, via the coherency module, the local storage location may include: requesting an unlock concerning the local storage location from the coherency module, and receiving an unlock confirmation concerning the local storage location from the coherency module.

The hyper-converged storage environment may include a first storage environment portion and a second storage environment portion. The first storage environment portion may include a first coherency module. The second storage environment portion may include a second coherency module.

In another implementation, a computer program product resides on a computer readable medium and has a plurality of instructions stored on it. When executed by a processor, the instructions cause the processor to perform operations including defining an IO splitter module within each of a plurality of nodes included within a hyper-converged storage environment. A coherency module is defined on at least one of the plurality of nodes. A data request is received.

One or more of the following features may be included. The data request may be a data read request for a data extent. The data read request may be processed on a local IO splitter module of a local node that contains the data extent to be read. A local storage location within the local node that contains the data extent to be read may be locked via the coherency module. The data extent may be read from the local storage location. The local storage location within the local node that contains the data extent that was read may be unlocked via the coherency module.

Locking, via the coherency module, a local storage location within the local node that contains the data extent to be read may include: requesting a lock concerning the local storage location from the coherency module, and receiving a lock confirmation concerning the local storage location from the coherency module. Unlocking, via the coherency module, the local storage location within the local node that contains the data extent that was read may include: requesting an unlock concerning the local storage location from the coherency module, and receiving an unlock confirmation concerning the local storage location from the coherency module.

The data request may be a data write request for a data extent. The data write request may be processed on a local IO splitter module of a local node onto which the data extent is to be written. A remote storage location within a remote node into which a remote copy of the data extent is to be written and a local storage location within the local node into which a local copy of the data extent is to be written may be locked via the coherency module. The remote copy of the data extent may be written into the remote storage location and the remote storage location may be unlocked via the coherency module. The local copy of the data extent may be written into the local storage location and the local storage location may be unlocked via the coherency module.

Locking, via the coherency module, a remote storage location within a remote node into which a remote copy of the data extent is to be written and a local storage location within the local node into which a local copy of the data extent is to be written may include: requesting a lock concerning the remote storage location from the coherency module, receiving a lock confirmation concerning the remote storage location from the coherency module, requesting a lock concerning the local storage location from the coherency module, and receiving a lock confirmation concerning the local storage location from the coherency module.

Writing the remote copy of the data extent into the remote storage location and unlocking, via the coherency module, the remote storage location may include: requesting an unlock concerning the remote storage location from the coherency module, and receiving an unlock confirmation concerning the remote storage location from the coherency module. Writing the local copy of the data extent into the local storage location and unlocking, via the coherency module, the local storage location may include: requesting an unlock concerning the local storage location from the coherency module, and receiving an unlock confirmation concerning the local storage location from the coherency module.

The hyper-converged storage environment may include a first storage environment portion and a second storage environment portion. The first storage environment portion may include a first coherency module. The second storage environment portion may include a second coherency module.

In another implementation, a computing system including a processor and memory is configured to perform operations including defining an IO splitter module within each of a plurality of nodes included within a hyper-converged storage environment. A coherency module is defined on at least one of the plurality of nodes. A data request is received.

One or more of the following features may be included. The data request may be a data read request for a data extent. The data read request may be processed on a local IO splitter module of a local node that contains the data extent to be read. A local storage location within the local node that contains the data extent to be read may be locked via the coherency module. The data extent may be read from the local storage location. The local storage location within the local node that contains the data extent that was read may be unlocked via the coherency module.

The data request may be a data write request for a data extent. The data write request may be processed on a local IO splitter module of a local node onto which the data extent is to be written. A remote storage location within a remote node into which a remote copy of the data extent is to be written and a local storage location within the local node into which a local copy of the data extent is to be written may be locked via the coherency module. The remote copy of the data extent may be written into the remote storage location and the remote storage location may be unlocked via the coherency module. The local copy of the data extent may be written into the local storage location and the local storage location may be unlocked via the coherency module.

The hyper-converged storage environment may include a first storage environment portion and a second storage environment portion. The first storage environment portion may include a first coherency module. The second storage environment portion may include a second coherency module.

The details of one or more implementations are set forth in the accompanying drawings and the description below. Other features and advantages will become apparent from the description, the drawings, and the claims.

BRIEF DESCRIPTION OF THE DRAWINGS

FIG. 4 is a flow chart of another implementation of the data coherency process of FIG. 1; and.

Like reference symbols in the various drawings indicate like elements.

DETAILED DESCRIPTION OF THE PREFERRED EMBODIMENTS

Figure 1:
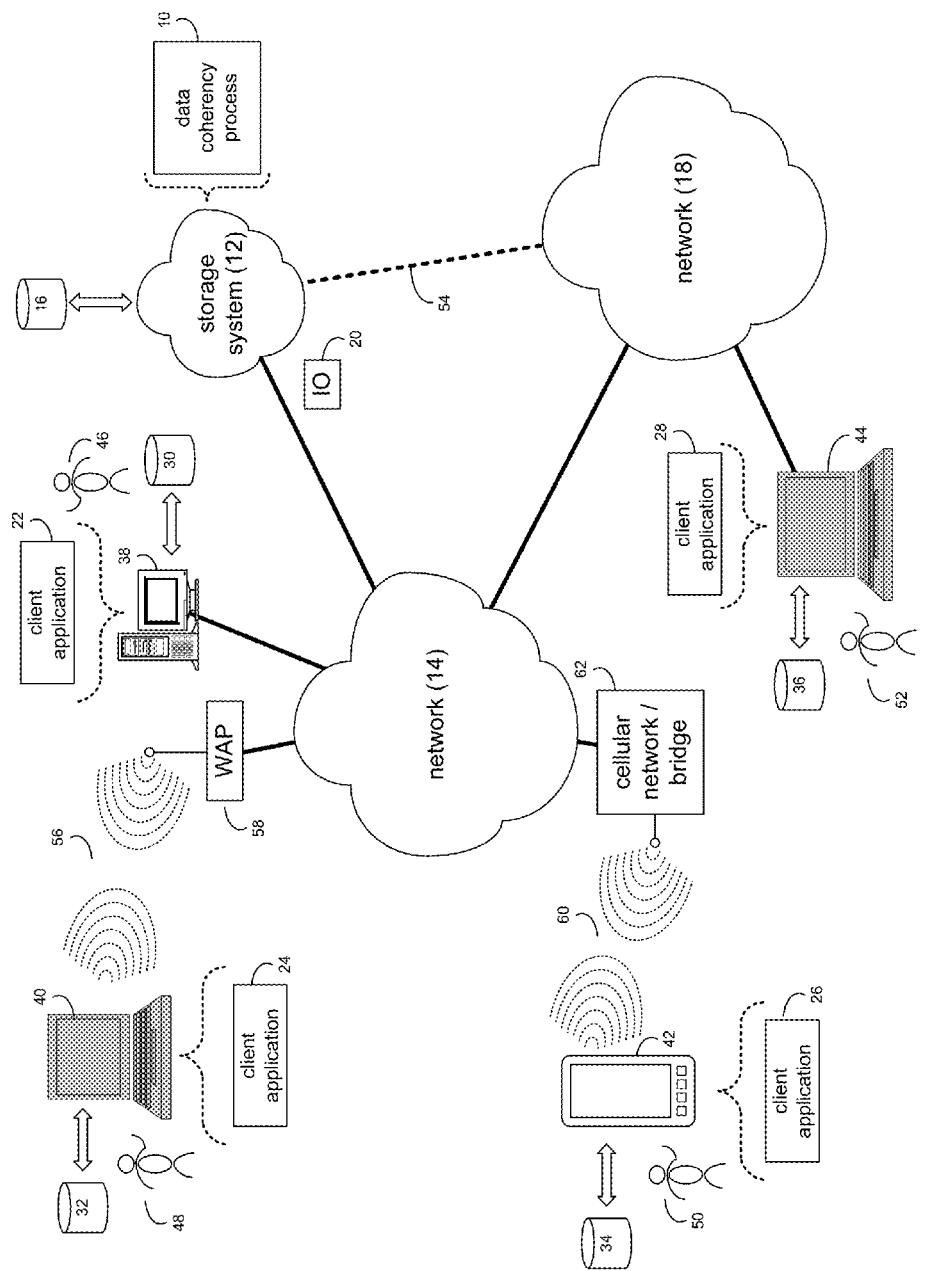
FIG. 1 is a diagrammatic view of a storage system and a data coherency process coupled to a distributed computing network.

System Overview:

Referring to FIG. 1, there is shown data coherency process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), one or more personal computers, one or more server computers, and a cloud-based platform.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: a Windows™ operating system; a Linux™ operating system, a Unix™ operating system, an EMC™ operating system, or a custom operating system.

The instruction sets and subroutines of data coherency process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a personal digital assistant (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between personal digital assistant 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

Figure 2:
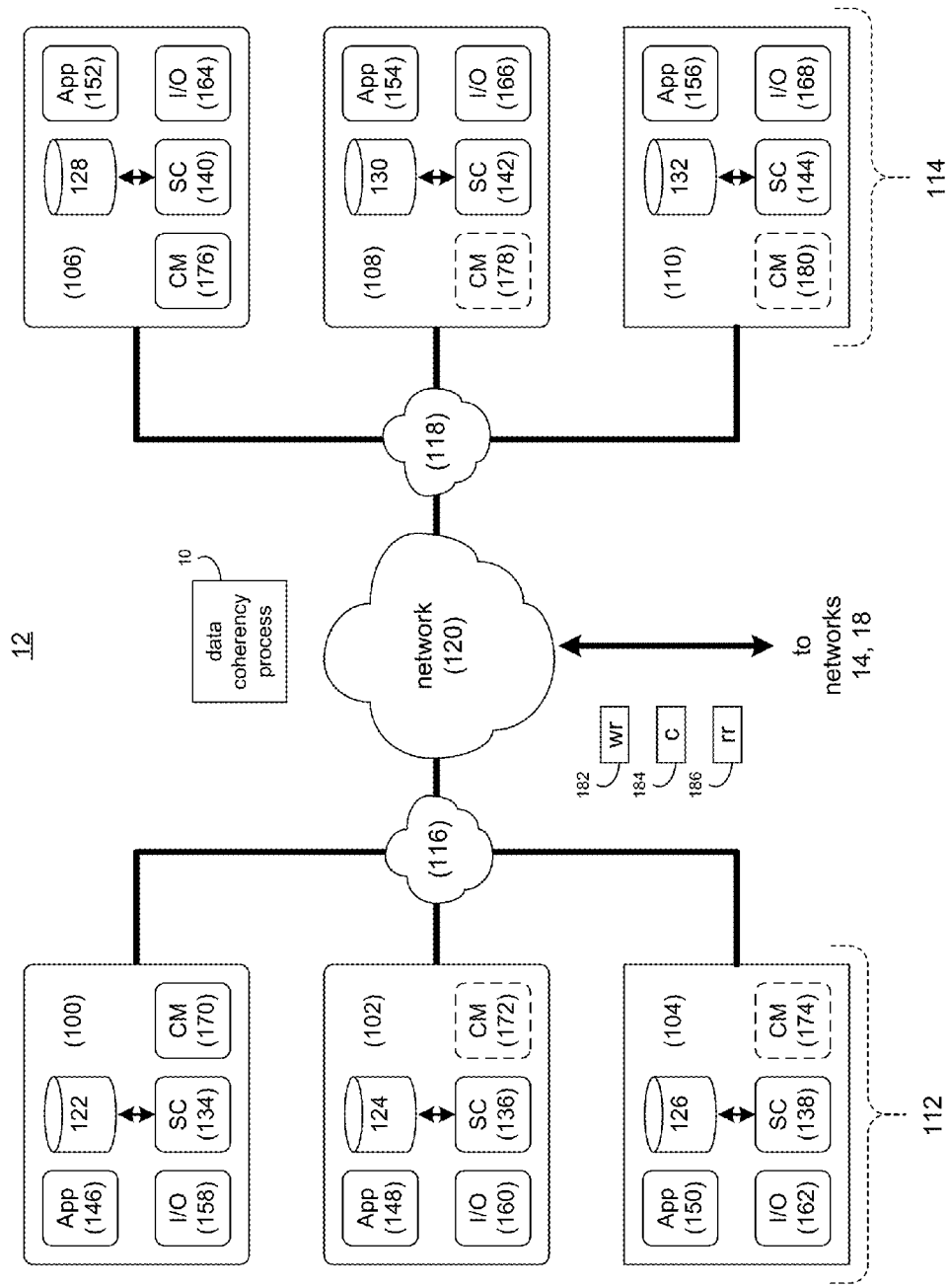
FIG. 2 is a diagrammatic view of the storage system of FIG. 1.

The Storage System:

For illustrative purposes, storage system 12 will be described as being a hyper-converged storage environment. However, this is for illustrative purposes only and is not intended to be a limitation of this disclosure, as other configurations are possible and are considered to be within the scope of this disclosure. Specifically and referring also to FIG. 2, storage system 12 may be a hyper-converged storage system that includes a plurality of nodes (e.g., nodes 100, 102, 104, 106, 108, 110). Examples of nodes 100, 102, 104, 106, 108, 110 may include but are not limited to one or more personal computers, one or more server computers, one or more mini computers, one or more RAID devices, one or more NAS systems, and all or a portion of one or more SAN systems, wherein (in hyper-converged systems) these nodes are generally multipurpose and may be e.g., storage nodes, network nodes and/or compute nodes.

This plurality of nodes (e.g., nodes 100, 102, 104, 106, 108, 110) may be divided/partitioned into different portions (e.g., first storage environment portion 112 and second storage environment portion 114). For example and for illustrative purposes only, first storage environment portion 112 may include nodes 100, 102, 104 coupled via network 116, wherein network 116 may be an Ethernet (e.g., Layer 2 or Layer 3) network, a fiber channel network, an InfiniBand network, or any other circuit switched/packet switched network. Further, second storage environment portion 114 may include nodes 106, 108, 110 coupled via network 118, wherein network 118 may also be an Ethernet (e.g., Layer 2 or Layer 3) network, a fiber channel network, an InfiniBand network, or any other circuit switched/packet switched network. Additionally, network 116 and network 118 may be coupled via network 120 (examples of which may include but are not limited to a Wide Area Network (WAN), wherein network 120 (or network 116/network 118) may be coupled to networks 14, 18.

Each of the plurality of nodes (e.g., nodes 100, 102, 104, 106, 108, 110) may include a storage device (e.g., storage devices 122, 124, 126, 128, 130, 132, respectively) accessible via a storage controller (e.g., storage controllers 134, 136, 138, 140, 142, 144). Examples of storage devices 122, 124, 126, 128, 130, 132 may include but is not limited to: a hard disk drive; a tape drive; an optical drive; a RAID device; a random access memory (RAM); a read-only memory (ROM); and all forms of flash memory storage devices.

As discussed above, the instruction sets and subroutines of data coherency process 10 may be executed by one or more processors (not shown) and one or more memory architectures (not shown) included within storage system 12. For example, the instruction sets and subroutines of data coherency process 10 may be stored on one or more of storage devices 122, 124, 126, 128, 130, 132 and may be executed by one or more processors (not shown) and one or more memory architectures (not shown) included within nodes 100, 102, 104, 106, 108, 110 (respectively).

Each of the plurality of nodes (e.g., nodes 100, 102, 104, 106, 108, 110) may execute one or more applications (e.g., applications 146, 148, 150, 152, 154, 156), examples of which may include but are not limited to word processing applications, database applications, spreadsheet applications, contact management applications, time entry applications, and enterprise applications, such as Oracle RAC™ or VMFS™ clustered file system that allow for the execution of virtual machines on multiple sites. Applications 146, 148, 150, 152, 154, 156 (or client applications 22, 24, 26, 28) may generate various IO requests (e.g. IO request 20), examples of which may include but are not limited to data write requests (i.e. a request that content be written to storage system 12) and data read requests (i.e. a request that content be read from storage system 12).

Each of the plurality of nodes (e.g., nodes 100, 102, 104, 106, 108, 110) may include and execute an IO splitter module (e.g., IO splitter modules 158, 160, 162, 164, 166, 168, respectively) that may be configured to allow nodes 100, 102, 104, 106, 108, 110 to process various IO requests (e.g., IO request 20).

Further, one or more of the plurality of nodes (e.g., nodes 100, 102, 104, 106, 108, 110) may include and execute a coherency module (e.g., coherency modules 170, 172, 174, 176, 178, 180, respectively) that may be configured to allow nodes 100, 102, 104, 106, 108, 110 to process various IO requests (e.g., IO request 20). Each of nodes 100, 102, 104, 106, 108, 110 need not execute a coherency module, which is why coherency modules 172, 174, 178, 180 are shown in dashed lines. As discussed above, nodes 100, 102, 104, 106, 108, 110 may be divided/partitioned into e.g., first storage environment portion 112 and second storage environment portion 114, wherein each of portions 112, 114 may include at least one coherency module (e.g., coherency modules 170, 176, respectively) to minimize the impact of any latency due to network 120.

Storage system 12 and the plurality of nodes (e.g., nodes 100, 102, 104, 106, 108, 110) may be configured to operate in an active/active arrangement, wherein multiple (and identical) data sets may be stored within storage system 12 and nodes 100, 102, 104, 106, 108, 110 (thus allowing for a high level of data availability). In such an active/active arrangement, these multiple data sets may be simultaneously accessed and modified, wherein storage system 12 and nodes 100, 102, 104, 106, 108, 110 may be configured to reconcile any difference that may occur within these multiple data sets.

Additionally, storage system 12 may be configured to execute one or more virtual machine operating environments. An example of such a virtual machine operating environment may include but is not limited to a hypervisor, which is an instantiation of an operating system that may allow for multiple virtual machines to operate within a single physical device.

Figure 3:
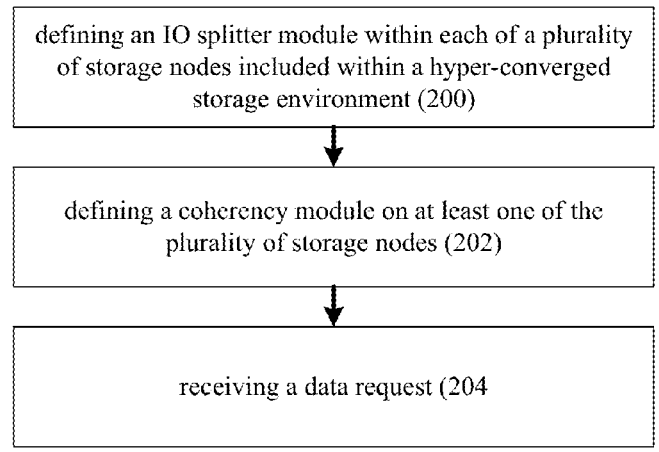
FIG. 3 is a flow chart of one implementation of the data coherency process of FIG. 1.

The Data Coherency Process:

For illustrative purposes and referring also to FIG. 3, assume that data coherency process 10 defines 200 an IO splitter module (e.g., IO splitter modules 158, 160, 162, 164, 166, 168) within each of the plurality of nodes (e.g., nodes 100, 102, 104, 106, 108, 110) included within a hyperconverged storage environment (e.g., storage system 12). Further and as discussed above, data coherency process 10 may define 202 a coherency module (e.g., coherency modules 170, 172, 174, 176, 178, 180) on at least one of the plurality of nodes (e.g., nodes 100, 102, 104, 106, 108, 110). Further, assume that data coherency process 10 receives 204 a data request (e.g., IO request 20).

As discussed above, various IO requests (e.g. IO request 20) may be processed by storage system 12. Examples of IO request 20 may include but are not limited to data write request 182 (i.e. a request that content 184 be written to storage system 12) and data read request 186 (i.e. a request that content 184 be read from storage system 12). For example, these IO requests (e.g. IO request 20) may be sent from client applications 22, 24, 26, 28 to storage system 12. Additionally/alternatively, these IO requests (e.g. IO request 20) may be sent from applications 146, 148, 150, 152, 154, 156. Further still, the same application (e.g., one or more of applications 146, 148, 150, 152, 154, 156) may run in a cluster configuration on multiple nodes (e.g., one or more of nodes 100, 102, 104, 106, 108, 110) and may share the same storage resources (e.g., one or more of storage devices 122, 124, 126, 128, 130, 132), thus allowing for higher availability and resiliency but requiring a methodology for maintaining coherency (e.g., though the use of coherency modules 170, 172, 174, 176, 178, 180).

Processing Read Requests:

Assume for illustrative purposes only that IO request 20 is a data read request (e.g., data read request 186) requesting that content 184 (e.g., an extent) be read from storage system 12. For this example, further assume that content 184 (the data extent requested in data read request 186) is located on node 100.

Figure 4:
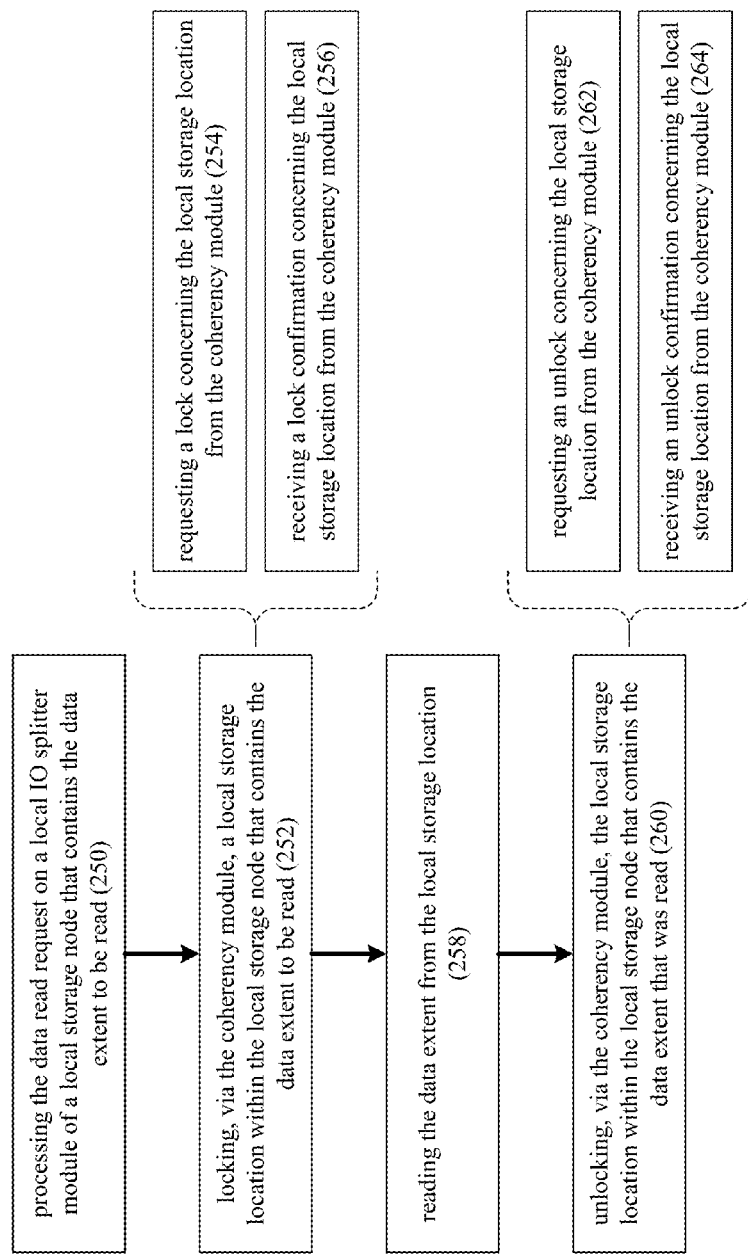

Accordingly and referring also to FIG. 4, data coherency process 10 may process 250 the data read request (e.g., data read request 186) on a local IO splitter module (e.g., IO splitter module 158) of a local node (e.g., node 100) that contains the data extent (e.g., content 184) to be read.

Data coherency process 10 may lock 252 (via e.g., coherency module 170) a local storage location (e.g., a track or sector or any portion of a logical device within storage device 122) within the local node (e.g., node 100) that contains the data extent (e.g., content 184) to be read. Specifically, data coherency process 10 may lock 252 this storage location within storage device 122 to e.g., prevent this storage location from being overwritten while content 184 is being read from this location.

When locking 252 the local storage location (e.g., the track or sector within storage device 122) within node 100 that contains the data extent (e.g., content 184) to be read, data coherency process 10 may: request 254 a lock concerning the local storage location (e.g., the track or sector within storage device 122) from coherency module 170; and may receive 256 a lock confirmation concerning the local storage location (e.g., the track or sector within storage device 122) from coherency module 170.

Once locked 252, data coherency process 10 may read 258 the data extent (e.g., content 184) from the local storage location (e.g., the track or sector within storage device 122) and may unlock 260 (e.g., via coherency module 170) the local storage location (e.g., the track or sector within storage device 122) within the local node (e.g., node 100) that contains the data extent (e.g., content 184) that was read. Specifically, data coherency process 10 may unlock 260 this storage location within storage device 122 to e.g., allow this storage location to be overwritten in the future.

When unlocking 260 the local storage location (e.g., the track or sector within storage device 122) within node 100 that contains the data extent (e.g., content 184) that was read, data coherency process 10 may: request 262 an unlock concerning the local storage location (e.g., the track or sector within storage device 122) from coherency module 170; and may receive 264 an unlock confirmation concerning the local storage location (e.g., the track or sector within storage device 122) from coherency module 170.

Processing Write Requests:

Assume for illustrative purposes only that IO request 20 is a data write request (e.g., data write request 182) requesting that content 184 (e.g., an extent) be written to storage system 12. For this example, further assume that content 184 (i.e., the data extent defined within data write request 182 for writing to storage system 12) is to be locally stored on node 100. Additionally, a second copy of content 184 (i.e., the data extent defined within data write request 182 for writing to storage system 12) is to be remotely stored on node 106 (thus enabling the active/active arrangement described above).

Figure 5:
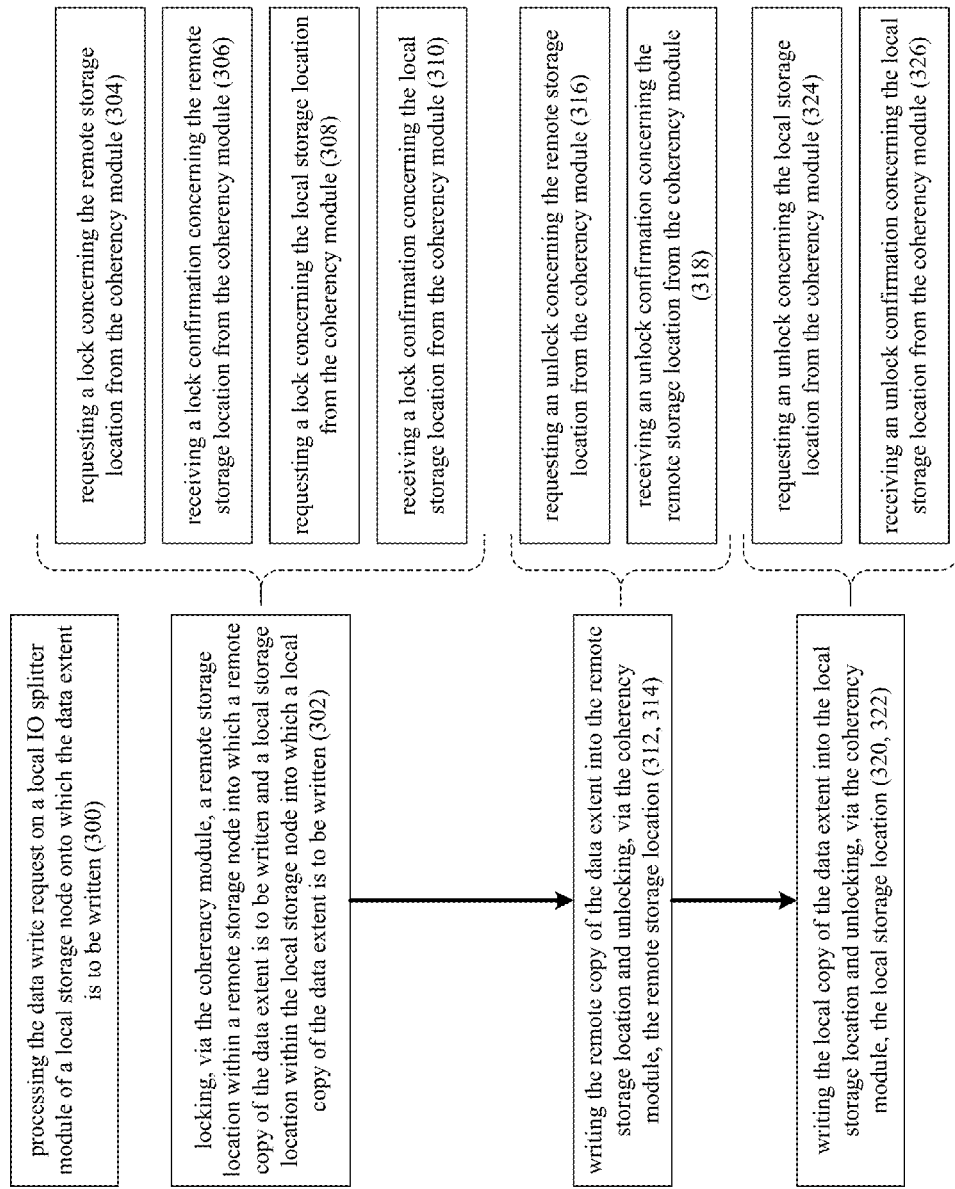
FIG. 5 is a flow chart of another implementation of the data coherency process of FIG. 1.

Accordingly and referring also to FIG. 5, data coherency process 10 may process 300 the data write request (e.g., data write request 182) on a local IO splitter module (e.g., IO splitter module 158) of a local node (e.g., node 100) onto which the data extent (e.g., content 184) is to be written.

Data coherency process 10 may lock 302 (via e.g., coherency module coherency module 176) a remote storage location (e.g., a track or sector within storage device 128) within a remote node (e.g., node 106) into which a remote copy of the data extent (e.g., content 184) is to be written and a local storage location (e.g., the track or sector within storage device 122) within the local node (e.g., node 100) into which a local copy of the data extent (e.g., content 184) is to be written. Specifically, data coherency process 10 may lock 302 these storage locations within storage devices 122, 128 to e.g., prevent these storage locations from being overwritten while content 184 is being written to these locations, and may also prevent reads from multiple node during data updates.

When locking 302 the remote storage location (e.g., the track or sector within storage device 128) within node 106 into which a remote copy of the data extent (e.g., content 184) is to be written and the local storage location (e.g., the track or sector within storage device 122) within node 100 into which a local copy of the data extent (e.g., content 184)

is to be written, data coherency process 10 may: request 304 a lock concerning the remote storage location (e.g., the track or sector within storage device 128) from coherency module 176; may receive 306 a lock confirmation concerning the remote storage location (e.g., the track or sector within storage device 128) from coherency module 176; may request 308 a lock concerning the local storage location (e.g., the track or sector within storage device 122) from coherency module 176; and may receive 310 a lock confirmation concerning the local storage location (e.g., the track or sector within storage device 122) from coherency module 176.

Once locked 302, data coherency process 10 may write 312 the remote copy of the data extent (e.g., content 184) into the remote storage location (e.g., the track or sector within storage device 128) and may unlock 314 (via coherency module 176) the remote storage location (e.g., the track or sector within storage device 128). Specifically, data coherency process 10 may unlock 314 this storage location within storage device 128 to e.g., allow this storage location to be overwritten in the future.

When writing 312 the remote copy of the data extent (e.g., content 184) into the remote storage location (e.g., the track or sector within storage device 128) and unlocking 314 the remote storage location (e.g., the track or sector within storage device 128), data coherency process 10 may request 316 an unlock concerning the remote storage location (e.g., the track or sector within storage device 128) from coherency module 176 and may receive 318 an unlock confirmation concerning the remote storage location (e.g., the track or sector within storage device 128) from coherency module 176.

Further and once locked 302, data coherency process 10 may write 320 the local copy of the data extent (e.g., content 184) into the local storage location (e.g., the track or sector within storage device 122) and may unlock 322 (via coherency module 176) the local storage location (e.g., the track or sector within storage device 122). Specifically, data coherency process 10 may unlock 322 this storage location within storage device 122 to e.g., allow this storage location to be overwritten in the future.

When writing 320 the local copy of the data extent (e.g., content 184) into the local storage location (e.g., the track or sector within storage device 122) and unlocking 322 the local storage location (e.g., the track or sector within storage device 122), data coherency process 10 may request 324 an unlock concerning the local storage location (e.g., the track or sector within storage device 122) from coherency module 176 and may receive 326 an unlock confirmation concerning the local storage location (e.g., the track or sector within storage device 122) from coherency module 176.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
    defining an IO splitter module within each of a plurality of nodes included within a hyper-converged storage environment;
    defining a coherency module on at least one of the plurality of nodes;
    receiving a data request, wherein the data request is one or more of a data read request and a data write request;
    processing a data write request on a local IO splitter module of a local node onto which a data extent is to be written, wherein processing the data write request includes determining a local storage location within the local node and a remote storage location within a remote node; and
    locking, via the coherency module, the remote storage location within the remote node into which a remote copy of the data extent is to be written and the local storage location within the local node into which a local copy of the data extent is to be written in response to a single data write request, wherein locking the remote storage location and the local storage location includes:
        requesting a lock concerning the remote storage location from the coherency module,
        receiving a lock confirmation concerning the remote storage location from the coherency module,
        writing the remote copy of the data extent into the remote storage location,
        requesting a lock concerning the local storage location from the coherency module,
        receiving a lock confirmation concerning the local storage location from the coherency module, and
        writing the local copy of the data extent into the local storage location.

2. The computer-implemented method of claim 1 wherein the data request is a data read request for a data extent, the computer-implemented method further comprising:
    processing the data read request on a local IO splitter module of a local node that contains the data extent to be read;
    locking, via the coherency module, a local storage location within the local node that contains the data extent to be read;
    reading the data extent from the local storage location; and
    unlocking, via the coherency module, the local storage location within the local node that contains the data extent that was read.

3. The computer-implemented method of claim 2 wherein:
    locking, via the coherency module, a local storage location within the local node that contains the data extent to be read includes:
        requesting a lock concerning the local storage location from the coherency module, and
        receiving a lock confirmation concerning the local storage location from the coherency module; and
    unlocking, via the coherency module, the local storage location within the local node that contains the data extent that was read includes:
        requesting an unlock concerning the local storage location from the coherency module, and
        receiving an unlock confirmation concerning the local storage location from the coherency module.

4. The computer-implemented method of claim 1 further comprising:
    unlocking, via the coherency module, the remote storage location; and unlocking, via the coherency module, the local storage location.

5. The computer-implemented method of claim 4 wherein unlocking, via the coherency module, the remote storage location includes:
   requesting an unlock concerning the remote storage location from the coherency module, and
   receiving an unlock confirmation concerning the remote storage location from the coherency module.

6. The computer-implemented method of claim 4 wherein unlocking, via the coherency module, the local storage location includes:
   requesting an unlock concerning the local storage location from the coherency module, and
   receiving an unlock confirmation concerning the local storage location from the coherency module.

7. The computer-implemented method of claim 1 wherein the hyper-converged storage environment includes a first storage environment portion and a second storage environment portion, the first storage environment portion includes a first coherency module, and the second storage environment portion includes a second coherency module.

8. A computer program product residing on a non-transitory computer readable medium having a plurality of instructions stored thereon which, when executed by a processor, cause the processor to perform operations comprising:
   defining an IO splitter module within each of a plurality of nodes included within a hyper-converged storage environment;
   defining a coherency module on at least one of the plurality of nodes;
   receiving a data request, wherein the data request is one or more of a data read request and a data write request;
   processing the data write request on a local IO splitter module of a local node onto which the data extent is to be written, wherein processing the data write request includes determining a local storage location within the local node and a remote storage location within a remote node; and
   locking, via the coherency module, a remote storage location within a remote node into which a remote copy of the data extent is to be written and a local storage location within the local node into which a local copy of the data extent is to be written, wherein locking the remote storage location and the local storage location includes:
      requesting a lock concerning the remote storage location from the coherency module,
      receiving a lock confirmation concerning the remote storage location from the coherency module,
      writing the remote copy of the data extent into the remote storage location,
      requesting a lock concerning the local storage location from the coherency module,
      receiving a lock confirmation concerning the local storage location from the coherency module, and
      writing the local copy of the data extent into the local storage location.

9. The computer program product of claim 8 wherein the data request is a data read request for a data extent, the computer-implemented method further comprising instructions for:
   processing the data read request on a local IO splitter module of a local node that contains the data extent to be read;
   locking, via the coherency module, a local storage location within the local node that contains the data extent to be read;
   reading the data extent from the local storage location; and
   unlocking, via the coherency module, the local storage location within the local node that contains the data extent that was read.

10. The computer program product of claim 9 wherein:
   locking, via the coherency module, a local storage location within the local node that contains the data extent to be read includes:
      requesting a lock concerning the local storage location from the coherency module, and
      receiving a lock confirmation concerning the local storage location from the coherency module; and
   unlocking, via the coherency module, the local storage location within the local node that contains the data extent that was read includes:
      requesting an unlock concerning the local storage location from the coherency module, and
      receiving an unlock confirmation concerning the local storage location from the coherency module.

11. The computer program product of claim 8 further comprising instructions for:
   unlocking, via the coherency module, the remote storage location; and
   unlocking, via the coherency module, the local storage location.

12. The computer program product of claim 11 wherein unlocking, via the coherency module, the remote storage location includes:
   requesting an unlock concerning the remote storage location from the coherency module, and
   receiving an unlock confirmation concerning the remote storage location from the coherency module.

13. The computer program product of claim 11 wherein unlocking, via the coherency module, the local storage location includes:
   requesting an unlock concerning the local storage location from the coherency module, and
   receiving an unlock confirmation concerning the local storage location from the coherency module.

14. The computer program product of claim 8 wherein the hyper-converged storage environment includes a first storage environment portion and a second storage environment portion, the first storage environment portion includes a first coherency module, and the second storage environment portion includes a second coherency module.

15. A computing system including a processor and memory configured to perform operations comprising:
   defining, by the processor, an IO splitter module within each of a plurality of nodes included within a hyper-converged storage environment;
   defining, by the processor, a coherency module on at least one of the plurality of nodes;
   receiving, by the processor, a data request, wherein the data request is one or more of a data read request and a data write request;
   processing the data write request on a local IO splitter module of a local node onto which the data extent is to be written, wherein processing the data write request includes determining a local storage location within the local node and a remote storage location within a remote node; and
   locking, via the coherency module, a remote storage location within a remote node into which a remote copy of the data extent is to be written and a local storage location within the local node into which a local copy of the data extent is to be written, wherein locking the remote storage location and the local storage location includes:
  requesting a lock concerning the remote storage location from the coherency module,
  receiving a lock confirmation concerning the remote storage location from the coherency module,
  writing the remote copy of the data extent into the remote storage location,
  requesting a lock concerning the local storage location from the coherency module,
  receiving a lock confirmation concerning the local storage location from the coherency module, and
  writing the local copy of the data extent into the local storage location.

16. The computing system of claim 15 wherein the data request is a data read request for a data extent, the computer-implemented method further configured to perform operations comprising:

processing the data read request on a local IO splitter module of a local node that contains the data extent to be read;

locking, via the coherency module, a local storage location within the local node that contains the data extent to be read;

reading the data extent from the local storage location; and unlocking, via the coherency module, the local storage location within the local node that contains the data extent that was read.

17. The computing system of claim 15 wherein the hyper-converged storage environment includes a first storage environment portion and a second storage environment portion, the first storage environment portion includes a first coherency module, and the second storage environment portion includes a second coherency module.

* * * * *